H. H. Fleming,
Horse-Collar Fastener,
No. 51,033. Patented Nov. 21, 1865.

Witnesses:

Inventor:

UNITED STATES PATENT OFFICE.

H. H. FLEMING, OF KOKOMO, INDIANA.

IMPROVED HORSE-COLLAR FASTENING.

Specification forming part of Letters Patent No. 51,033, dated November 21, 1865.

*To all whom it may concern:*

Be it known that I, H. H. FLEMING, of Kokomo, in the county of Howard and State of Indiana, have invented a new and Improved Horse-Collar Fastening; and I do hereby declare that the following is a full, clear, and exact description thereof, which will enable others skilled in the art to make and use the same, reference being had to the accompanying drawings, forming part of this specification, in which—

Figure 1:
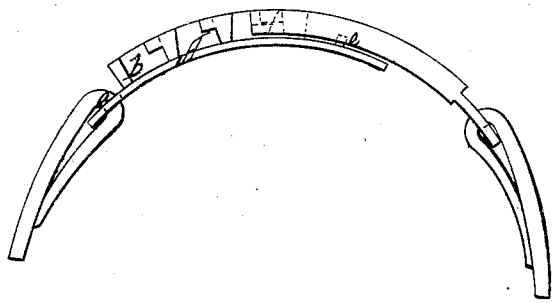
Figure 2:
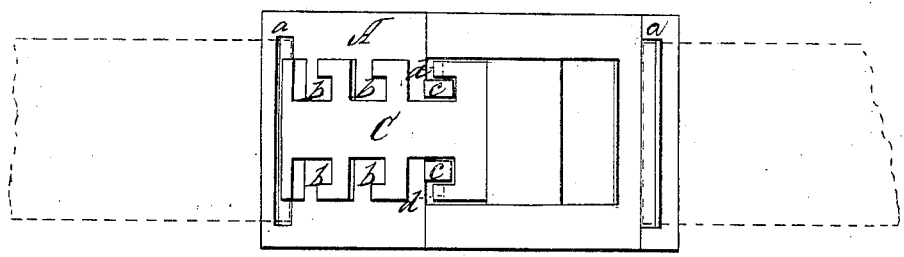
Figure 2:
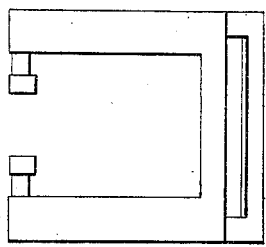

Figure 1 is a side view of the fastening applied to the harness-collar. Fig. 2 is a plan or top view of the same.

Similar letters of reference indicate like parts.

The object of my invention is to provide a firm and secure fastening for securing together the two ends of a horse-collar, and in such manner that it can be adjusted to make the collar fit different-sized horses' necks.

My invention consists in the employment of two metallic plates, the one carrying a supplementary plate on its top, having L-shaped grooves in its edges, and the other carrying projecting pieces made to fit into these L-shaped grooves, and so arranged that the length of the clasp or fastening may be varied at pleasure, to draw the two sides of the collar nearer together or let them fall farther apart, to decrease or increase the size of the collar as found necessary.

A designates the under, and B the upper plate of the fastening or clasp. They are curved in form, and have slots $a$ at their outer ends through which the straps on each end of the collar may have for securing them thereto.

On the top of the plate A, there is attached a metallic plate, C, having in its edges, on each side and opposite each other, L-shaped grooves or niches $b\ b$, the metal being cut away under the foot of the L, as shown in Fig. 1

The plate B consists of two arms made far enough apart to slide along on each side of the plate C. On the inner edges, near the end of each arm, there are made two projecting pieces or lugs which consist of a neck, $d$, and a nose, $c$, and so made that the neck will fit under the portion cut out from under the leg of the L, and the nose so made as to fit in the place above the leg of the L. This peculiar feature will be understood by reference to the drawings.

Two small pegs, $e$, are placed in the plate A, and corresponding recesses made in the under side of the plate B, and at such distances apart as to prevent the plate B from sliding forward so as to become disengaged on the plate A, as can be readily understood by reference to the drawings. The two plates having been attached, respectively, to each half of the collar or the strips thereon, the collar is secured to the horse's neck by opening the two ends and receiving the horse's neck therein. The two ends are then drawn together, and by means of my clasp are fastened, and the collar can be fitted to the horse's neck whether it be large or small. This will be found to be a very firm and reliable fastening.

What I claim as new and desire to secure by Letters Patent, is—

A fastening or clasp for fastening together horses' collars, constructed substantially as herein shown and described.

H. H. FLEMING.

Witnesses:
J. W. COOPER,
R. J. HASELTINE.